(12) United States Patent
Rossi et al.

(10) Patent No.: US 11,536,570 B2
(45) Date of Patent: Dec. 27, 2022

(54) METHOD FOR DETERMINING AN OPTIMIZED TRAJECTORY TO BE FOLLOWED BY AN AIRCRAFT, ASSOCIATED CONTROL METHOD, COMPUTER PROGRAM PRODUCT AND SYSTEMS

(71) Applicant: THALES, Courbevoie (FR)

(72) Inventors: Nicolas Rossi, Toulouse (FR); Benoît Dacre-Wright, Toulouse (FR); Cédric D'Silva, Toulouse (FR)

(73) Assignee: THALES, Courbevoie (FR)

( * ) Notice: Subject to any disclaimer, the term of this patent is extended or adjusted under 35 U.S.C. 154(b) by 178 days.

(21) Appl. No.: 16/719,409

(22) Filed: Dec. 18, 2019

(65) Prior Publication Data

US 2020/0200540 A1  Jun. 25, 2020

(30) Foreign Application Priority Data

Dec. 21, 2018  (FR) ..................... 18 73822

(51) Int. Cl.
*G01C 21/20* (2006.01)
*G08G 5/00* (2006.01)
*G08G 5/02* (2006.01)

(52) U.S. Cl.
CPC ............ *G01C 21/20* (2013.01); *G08G 5/006* (2013.01); *G08G 5/0069* (2013.01); *G08G 5/025* (2013.01)

(58) Field of Classification Search
CPC ...... G01C 21/20; G08G 5/006; G08G 5/0069; G08G 5/025
USPC ....................................................... 701/120
See application file for complete search history.

(56) References Cited

U.S. PATENT DOCUMENTS

| 7,103,455 B2* | 9/2006 | Subelet ................ G01C 23/005 244/175 |
| 2013/0080043 A1* | 3/2013 | Ballin .................. G08G 5/0078 701/120 |
| 2016/0125744 A1* | 5/2016 | Shamasundar ...... G08G 5/0039 701/122 |
| 2017/0092136 A1 | 3/2017 | Agrawal |

OTHER PUBLICATIONS

French Search Report, from the French Patent Office in counterpart French Application No. 1873822, dated Oct. 10, 2019.
Filippone, Antonion, "Mission Analysis (Chapter 15)—Advanced Aircraft Flight Performance Summary"; https://www.cambridge.org/core/books/abs/advanced-aircraft-flight-performance/mission-analysis/F2A8AA7E38E0DB1190FCE4BE72DFBE5B, published online Jan. 5, 2013.

* cited by examiner

*Primary Examiner* — Isaac G Smith
(74) *Attorney, Agent, or Firm* — ArentFox Schiff LLP

(57) ABSTRACT

A method for determining an optimized trajectory to be followed by an aircraft, the method being implemented by a determining system of the aircraft and comprising:
  a first step for acquiring at least one constraint relative to at least one parameter of the trajectory to be followed, the constraint being determined by a control system of a remote station as a function of the air traffic and/or the aircraft mission;
  a step for calculating a desired trajectory as a function of the constraint;
  a step for transmitting the desired trajectory to the remote station;
  a second step for acquiring an instruction comprising an authorization to follow the desired trajectory or a refusal of the desired trajectory.

14 Claims, 3 Drawing Sheets

METHOD FOR DETERMINING AN OPTIMIZED TRAJECTORY TO BE FOLLOWED BY AN AIRCRAFT, ASSOCIATED CONTROL METHOD, COMPUTER PROGRAM PRODUCT AND SYSTEMS

CROSS-REFERENCE TO RELATED APPLICATIONS

This application is a U.S. non-provisional application claiming the benefit of French Application No. 18 73822, filed on Dec. 21, 2018, which is incorporated herein by reference in its entirety.

FIELD

The present invention relates to a method for determining a trajectory of an aircraft.

The present invention also relates to an associated computer program product, determining system, control method and control system.

More specifically, the present invention relates to the management of air traffic in a particular airspace. Furthermore, the invention relates to embedded navigation and communication systems for air traffic control instructions, in particular digitally, interacting with air control stations on the ground, remote mission management stations or ground operation stations for unmanned aircraft.

BACKGROUND

In controlled airspaces, spatial (altitudes, heading) or temporal (speed, passage time) adjustment procedures are carried out by air traffic controllers to manage the spacing between aircraft. The aim is to anticipate and organize the spacing as well as possible, for example by an imposed heading or speed, a lateral and/or longitudinal separation of the aircraft, etc. Additionally, this management is for example completed by passage time instructions over geographical points, in particular to ensure the sequencing of converging traffic (for example during approaches toward airports, dense areas, etc.).

It should be noted that all trajectories must be validated by an air traffic control center, due to their impact on all air traffic.

Methods are thus known for determining a trajectory of an aircraft as a function of requirements from air traffic control, in particular as a function of other aircraft in an airspace. Such a trajectory is in particular determined by air traffic control so as to guarantee a safe space between the aircraft. Air traffic control knowing the positions and movements of the aircraft in the airspace, this makes it possible to determine instructions to be followed for the aircraft in the airspace and to send these instructions to be followed to the aircraft. An instruction is in particular an elementary action, on a parameter of the trajectory, such as the heading or the speed of the aircraft. Despite all of the planning put in place, imponderable events may still occur (evolution in wind/weather conditions, failure of an embedded system, surrounding traffic, etc.) and call the planned spacing into question. This then requires the air traffic controller to review and adapt the short-term ("tactical") spacing in non-nominal situations. It becomes necessary to constrain or adjust the flight time of an aircraft.

However, such determining methods are not fully satisfactory. In particular, the trajectories to be followed resulting from these instructions, imposed by the air traffic controller, are oftentimes not optimal for the aircraft. For example, instructions requested by the air traffic controller, depending on the case, may cause excess fuel consumption, or excess aircraft energy that may be detrimental to the stabilization and therefore safety of the flight.

SUMMARY

One aim of the invention is thus to propose a method for determining an optimized trajectory making it possible to account for constraints and preferences both of the remote station and the aircraft.

To that end, the invention relates to a method for determining an optimized trajectory to be followed by an aircraft, the method being implemented by a determining system of the aircraft and comprising:

a first step for acquiring at least one constraint relative to at least one parameter of the trajectory to be followed, the constraint being determined by a control system of a remote station as a function of the air traffic and/or the aircraft mission;

a step for calculating a desired trajectory as a function of the constraint;

a step for transmitting the desired trajectory to the remote station;

a second step for acquiring an instruction comprising an authorization to follow the desired trajectory or a refusal of the desired trajectory, the instruction being sent by the remote station and being generated following a verification of the compliance of the desired trajectory with the plurality of constraints updated based on the current air traffic and/or the aircraft mission;

a step for following the desired trajectory when the instruction comprises the authorization to follow this trajectory.

According to other advantageous aspects of the invention, the method comprises one or more of the following features, considered alone or according to all technically possible combinations:

the desired trajectory determined during the calculating step is a trajectory optimized as a function of at least one operational parameter among the fuel consumption, the aerodynamic stability of the aircraft, the flight duration, and noise nuisances.

when the instruction comprises a refusal of the desired trajectory, a step for calculating a new desired trajectory is carried out, the transmission step and the second acquisition step then being repeated for this new desired trajectory.

the trajectory to be followed by the aircraft is an approach trajectory of the landing strip or a trajectory arriving at a traffic convergence point.

when the instruction comprises the refusal of the desired trajectory, the second acquisition step further comprises acquiring a modified trajectory determined by the remote station, the modified trajectory being separate from the desired trajectory, and the method further comprises a step for following the modified trajectory.

the first acquisition step further comprises acquiring a position to be reached at an indicated time.

each parameter of the trajectory to be followed by the aircraft is a parameter chosen from the group consisting of speed, heading of the trajectory, gradient of the trajectory, modification start position of the trajectory, modification end position of the trajectory, altitude, latitude, longitude, distance to be traveled, and the flight time of the aircraft.

the method further comprising a step for displaying the instruction received during the second acquisition step on a display device of the aircraft.

the constraint, the desired trajectory and the instruction are transmitted via a digital data transmission link between the aircraft and the remote station.

the remote station is chosen from the list consisting of a ground air traffic control center, a ground operation center, an operation center on board an aircraft, and a ground operation station for unmanned aircraft.

The invention also relates to a determining system of an aircraft configured to determine an optimized trajectory to be followed by the aircraft, the determining system being configured to:

acquire at least one constraint relative to at least one parameter of the trajectory to be followed, the constraint being determined by a control system of a remote station as a function of the air traffic and/or the aircraft mission;

calculate a desired trajectory as a function of the constraint;

transmit the desired trajectory to the remote station;

acquire an instruction comprising an authorization to follow the desired trajectory or a refusal of the desired trajectory, the instruction being sent by the remote station and being generated following a verification of the compliance of the desired trajectory with the plurality of constraints updated based on the current air traffic and/or the aircraft mission;

follow the desired trajectory when the instruction comprises the authorization to follow this trajectory.

The invention also relates to a control method for a trajectory of an aircraft, the method being carried out by a control system of a remote station, the method comprising:

a step for determining at least one constraint relative to at least one parameter of the trajectory of the aircraft as a function of the air traffic and/or the aircraft mission, a step for transmitting the constraint to the aircraft;

a step for acquiring a desired trajectory of the aircraft calculated by a determining system of the aircraft as a function of the constraint;

a step for verifying the compliance of the desired trajectory with the plurality of constraints updated based on the current air traffic and/or the aircraft mission;

a step for transmitting an instruction to the aircraft, the instruction comprising an authorization to follow the desired trajectory or a refusal of the desired trajectory, as a function of the compliance of the desired trajectory;

a step for controlling the following of the desired trajectory when the instruction comprises the authorization to follow this trajectory.

The invention also relates to a control system of a remote station configured to:

determine at least one constraint relative to at least one parameter of the trajectory of the aircraft as a function of the air traffic and/or the aircraft mission, transmit the constraint to the aircraft;

acquire a desired trajectory of the aircraft calculated by a determining system of the aircraft as a function of the constraint;

verify the compliance of the desired trajectory with the plurality of constraints updated based on the current air traffic and/or the aircraft mission;

transmit an instruction to the aircraft, the instruction comprising an authorization to follow the desired trajectory or a refusal of the desired trajectory, as a function of the compliance of the desired trajectory;

follow the desired trajectory when the instruction comprises the authorization to follow this trajectory.

The invention also relates to a computer program product including software instructions which, when implemented by computer equipment, carry out the determining method or the control method as described hereinabove.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

Figure 1:
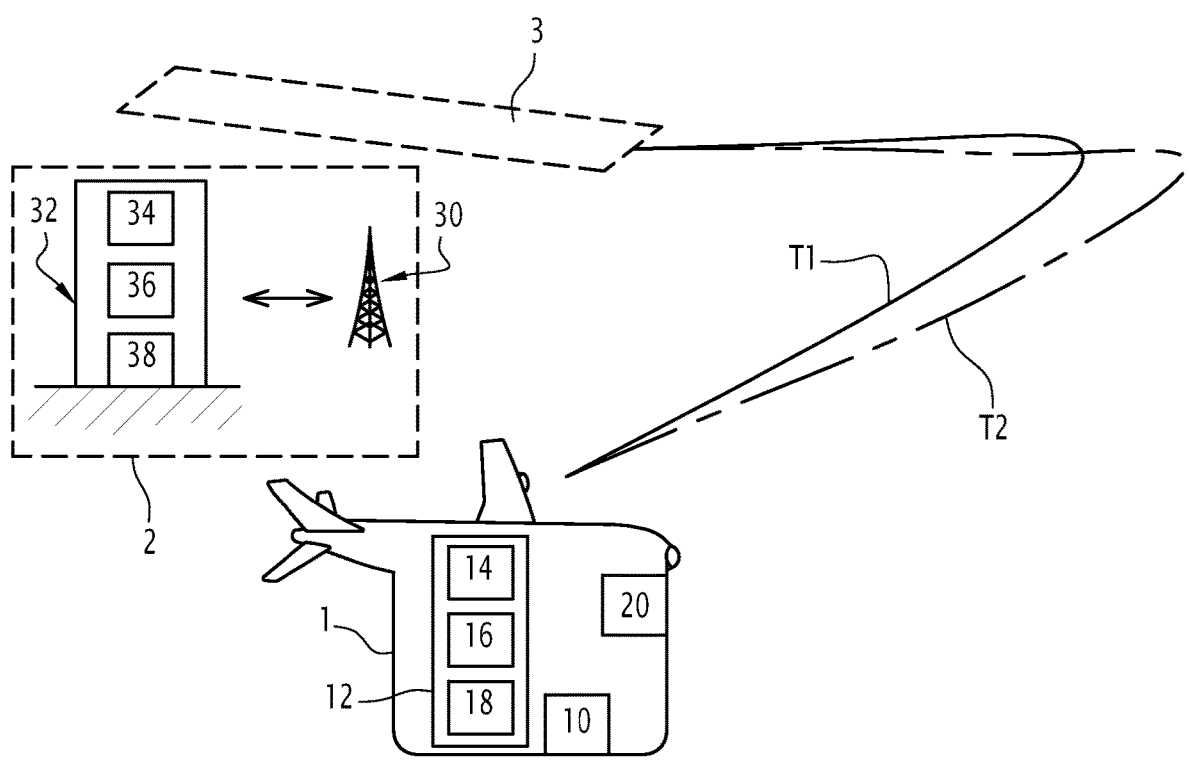
FIG. 1 is a schematic view of an assembly comprising an aircraft and a remote station.

In FIG. 1, an aircraft 1, a remote station 2 and a landing strip 3 are shown.

The aircraft 1 is, in a manner known in itself, able to follow a trajectory T1, T2 in a space, called "trajectory to be followed" in the present description. According to the example of FIG. 1, the trajectory to be followed is an approach trajectory of the landing strip 3. According to other examples, the trajectory to be followed is any trajectory of the aircraft, such as a climb or cruising trajectory.

According to one variant, the trajectory to be followed is a trajectory arriving at a traffic convergence point. Such a trajectory for example comprises a final point that is the traffic convergence point. "Traffic convergence point" refers to a point by which several aircraft are intended to pass. In other words, a traffic convergence point forms a common point of the trajectories of several aircraft present in the airspace.

The aircraft 1 comprises a transceiver device 10 for communicating with the remote station 2. The transceiver device 10 is in particular configured to transmit digital data usable by a computer of the remote station 2 and to receive digital data from the remote station 2.

The aircraft 1 further comprises a determining system 12 comprising an acquisition module 14, a processing module 16 and an output module 18.

The determining system 12 assumes the form of an independent computer or is for example integrated into a flight management system (FMS) of the aircraft 1, an electronic flight bag (EFB), a computer aiding on board navigation and/or any other existing embedded system.

In these cases, each of the aforementioned modules 14, 16, 18 at least partially assumes the form of software executable by a processor and stored in a memory of the corresponding computer.

In a variant or additionally, each of the aforementioned modules 14, 16, 18 at least partially assumes the form of a physical device, for example a programmable logic circuit, such as an FPGA (Field Programmable Gate Array), or the form of a dedicated integrated circuit, such as an ASIC (Application-Specific Integrated Circuit).

The aircraft 1 further comprises a display device 20. The display device 20 is configured to display at least one datum to the pilot of the aircraft 1. For example, the display device 20 is configured to display an instruction received from the remote station 2.

The remote station 2 can for example be an air traffic control station configured to control air traffic in an airspace associated with this station.

According to specific examples, the remote station is a ground air traffic control center, a ground operation center, an operation center on board an aircraft, and a ground operation station for unmanned aircraft.

The remote station 2 comprises a transceiver device 30 and a control system 32 comprising an acquisition module 34, a processing module 36 and an output module 38.

The transceiver device 30 is configured to communicate with the aircraft 1, and more specifically to transmit digital data to the transceiver device 10 of the aircraft 1 and to receive digital data coming from this device 10. In particular, the transceiver device 30 is able to form a transmission link with the transceiver device 10 in order to transmit digital data.

In the example of FIG. 1, the control system 32 for example assumes the form of a computer. In this case, each of the aforementioned modules 34, 36, 38 at least partially assumes the form of software executable by a processor and stored in a memory of this computer.

In a variant or additionally, each of the aforementioned modules 34, 36, 38 at least partially assumes the form of a physical device, for example a programmable logic circuit, such as an FPGA (Field Programmable Gate Array), or the form of a dedicated integrated circuit, such as an ASIC (Application-Specific Integrated Circuit).

Figure 2:
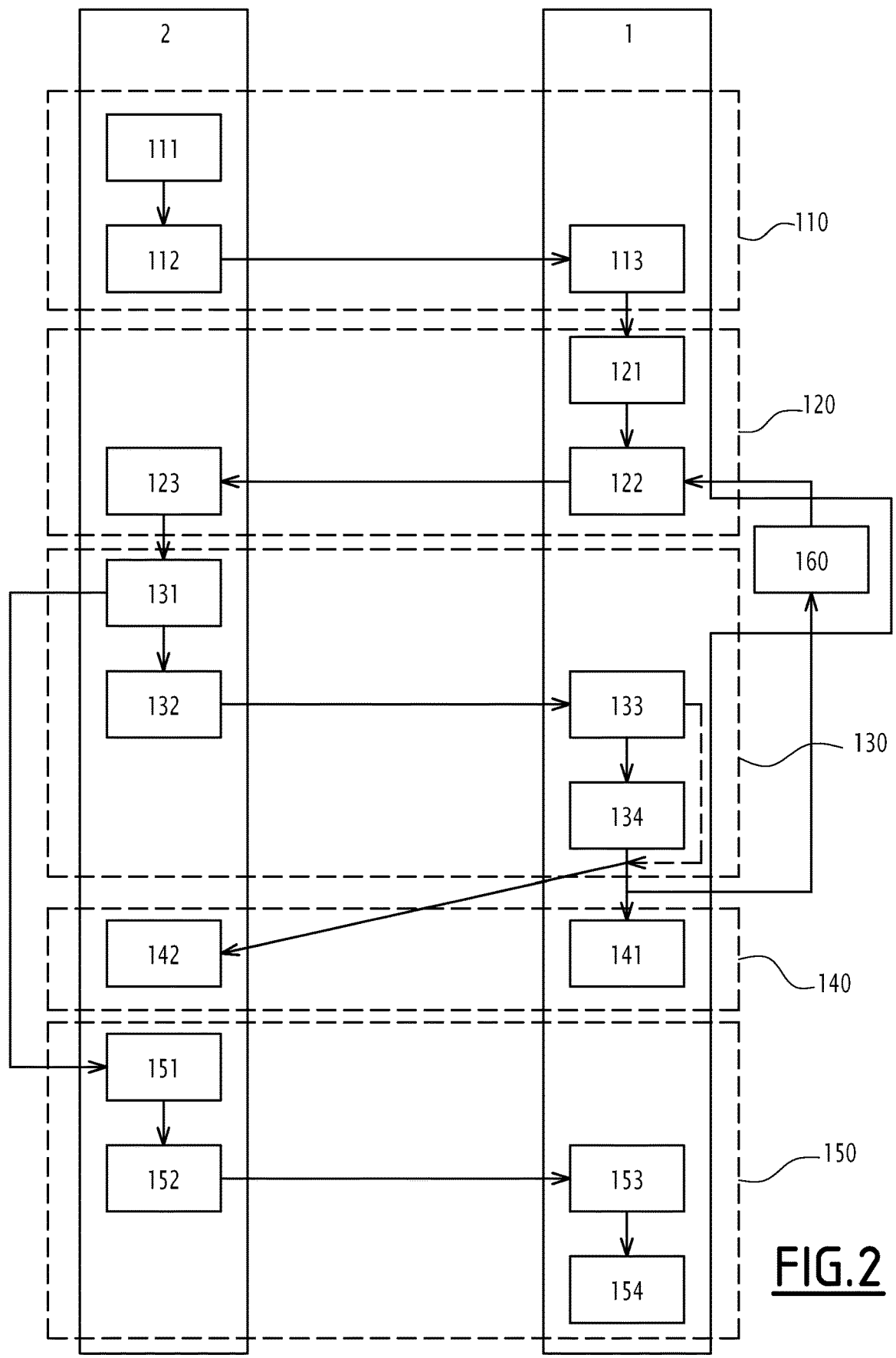
FIG. 2 is a flowchart of a determining method and a control method according to the invention, the methods being implemented by the assembly of FIG. 1.

A method for determining the trajectory of the aircraft 1 implemented by the determining system 12 of the aircraft 1 and a control method for the trajectory to be followed implemented by the control system 32 of the remote station 2 will now be described in relation to FIG. 2 illustrating a flowchart of these methods.

These methods are implemented simultaneously and comprise a first phase 110, a second phase 120, a third phase 130 and a fourth phase 140.

The first phase 110 comprises a determining step 111, a transmission step 112 and an acquisition step 113.

During the determining step 111, the control system 32 of the remote station 2 determines at least one constraint relative to at least one parameter of the trajectory of the aircraft 1 as a function of the air traffic and/or as a function of the aircraft mission.

According to one specific example, the control system 32 determines a single constraint. According to another example, the control system 32 determines at least two constraints for respective parameters.

The parameter of the trajectory to be followed is for example a speed, a heading of the trajectory, a gradient of the trajectory, a modification start position of the trajectory, a modification end position of the trajectory, an altitude, a latitude, a longitude, a distance to be traveled, or the flight time of the aircraft 1.

In particular, the parameter is a speed of the aircraft 1, the heading of the trajectory of the aircraft 1, the gradient of the trajectory of the aircraft 1, the modification start position of the trajectory, the modification end position of the trajectory, the altitude of the aircraft 1, the latitude of the aircraft 1 or the longitude of the aircraft 1, the distance traveled or to be traveled, or the flight time of the aircraft 1.

The constraint relative to the parameter is for example a maximum and/or minimum value of this parameter. For example, the constraint comprises one or several limits of the corresponding parameter. A constraint is for example a start or end date and time of a trajectory to be followed, a start or end position of a trajectory to be followed, a maximum and/or minimum speed, a maximum and/or minimum gradient, etc.

According to one example, the parameter of the trajectory to be followed is a parameter evolving along the trajectory of the aircraft 1, such as the distance traveled. The constraint relative to the parameter is in particular a future constraint of the trajectory to be followed, such as the distance to be traveled.

According to one example, the control system 32 of the remote station 2 further determines at least one position to be reached PA (shown in FIG. 3) at an indicated time TTM (Time To Meet). In addition, the control system 32 also determines a speed to be reached in the position to be reached PA at the indicated time TTM.

In particular to implement this step 111, the acquisition module 34 first receives information regarding the position and the movement of the aircraft in the airspace, and transmits this information to the processing module 36. Then, the processing module 36 implements algorithms known in themselves to determine the constraint or several constraints for the aircraft 1.

According to one example, the constraint further comprises a required time frame for a return of the desired trajectory of the aircraft 1.

During the transmission step 112, the remote station 2, in particular an air traffic control station, transmits the constraint to the aircraft 1. In particular, the output module 38 transmits a signal comprising the constraint to the transceiver device 30. The transceiver device 30 sends the constraint to the aircraft 2.

In addition, the remote station 2, and in particular the transceiver device 30, further sends the position(s) to be reached at the indicated time.

During the acquisition step 113, the determining system 12 of the aircraft 1 receives the constraint sent by the remote station 2. For example, the determining system 12 receives the position(s) to be reached at the indicated time.

The second phase 120 comprises a calculating step 121, a transmission step 122 and an acquisition step 123.

During the calculating step 121, the determining system 12 determines a desired trajectory as a function of the constraint received during step 113.

In particular, the acquisition module 14 of the determining system 12 receives the constraint and transmits this constraint to the processing module 16. The processing module 16 calculates the desired trajectory as a function of the constraint. "Desired trajectory" refers to a trajectory optimized for the aircraft 1 according to at least one operational parameter of the aircraft 1. The operational parameter is a technical parameter relative to the operation of the aircraft 1. For example, the operational parameter is the fuel consumption, the aerodynamic stability of the aircraft 1, the flight time or the noise nuisances in particular emitted by the engines of the aircraft 1.

The processing module 16 implements an optimization algorithm known in the state of the art to determine the desired trajectory. The optimization algorithm is in particular specific to one type of aircraft 1. Input data for the optimization algorithm are in particular the constraints transmitted from the remote station 2. In one example, the optimization algorithm takes account of one or several operational parameters for example chosen according to preferences of the airline and the type of aircraft 1.

In the present example, the "flight time" and "noise annoyances" operational parameters are considered. The speed of the aircraft 1 is increased if the flight time must be reduced over a fixed distance to be traveled. As a result, the noise nuisances are increased.

For example, by adding the distance to be traveled parameter, the distance to be traveled is reduced without increasing the speed. As a result, the flight time is reduced while minimizing the noise nuisance. For example, as a function of the legal requirements and the preferences of the airline regarding the arrival time, the flight duration is thus optimized.

During the transmission step 122, the aircraft 1 transmits the desired trajectory to the remote station 2. In particular, the transceiver device 10 sends a signal comprising the desired trajectory to the transceiver device 30 of the remote station 2.

During the acquisition step 123, the remote station 2 receives the desired trajectory of the aircraft 2. In particular, the transceiver device 30 receives the signal comprising the desired trajectory and transmits the signal to the acquisition module 34.

The third phase 130 comprises a verification step 131, a transmission step 132 and an acquisition step 133.

During the verification step 131, the control system 32 of the remote station 2 verifies the compliance of the desired trajectory with a plurality of constraints updated based on the current air traffic or with the aircraft mission.

In particular, the processing module 36 implements a compliance check algorithm. The compliance check algorithm is known in itself and in particular takes account of changes in the air traffic in the time interval between the transmission step 112 of the constraint and the acquisition step 123 of the desired trajectory.

The processing module 36 determines the compliance or noncompliance of the desired trajectory with the constraints updated based on the air traffic (and/or optionally according to and/or with the aircraft mission). For example, the desired trajectory is noncompliant if it intersects the trajectory of another aircraft at a given moment such that a violation of the rules of separation between the aircraft would then be possible. During the verification step 131, any incompatibilities with the situation of the current air traffic are thus detected.

Following the verification of the compliance of the desired trajectory, the control system 32, and more specifically the processing module 36, determines an instruction comprising an authorization to follow the desired trajectory or a refusal of the desired trajectory. If the desired trajectory is according to the constraints of the current air traffic (and/or optionally the aircraft mission), the instruction determined by the processing module 36 is an authorization to follow this trajectory. If the desired trajectory is not compliant with the constraints, the instruction determined by the processing module 36 is a refusal of the desired trajectory.

During the transmission step 132, the remote station 2 transmits the instruction to the aircraft 1. In particular, the output module 38 transmits the instruction to the transceiver device 30. The transceiver device 30 emits a signal comprising the instruction to the transceiver device 10 of the aircraft 1.

During the acquisition step 133, the aircraft 1 receives the instruction emitted during step 132. In particular, the transceiver device 10 receives the signal comprising the instruction and transmits it to the determining system 12.

The third phase 130 optionally further comprises a display step 134, during which the received instruction is displayed on the display device 20 of the aircraft 1. In particular, an authorization to follow or a refusal of the desired trajectory is displayed on the display device 20 for the pilot of the aircraft 1.

The fourth phase 140, implemented when the instruction comprises the authorization to follow this trajectory, comprises a step for following 141 the desired trajectory and a step for checking the following 142 of the desired trajectory. The steps 141 and 142 are in particular implemented at the same time. In particular, the aircraft 1 follows the desired trajectory after the authorization to follow. The control system 32 checks the following of the desired trajectory.

Two embodiments of methods are described hereinafter when the instruction determined during the verification step 131 comprises a refusal of the desired trajectory.

According to a first embodiment, the methods comprise a fifth phase 150 comprising a determining step 151, a transmission step 152, an acquisition step 153 and a following step 154.

During the determining step 151, the control system 32 determines a modified trajectory separate from the desired trajectory. The determination of a trajectory by the remote station 2 is carried out by the processing module 36 of the remote station 2. The calculation of a trajectory by the control system 32 as a function of the air traffic is known in the state of the art. The imposition by the remote station 2 of a trajectory to be followed is typically called "vectoring" or "route clearance".

During step 152, the transceiver device 30 of the remote station 2 transmits the modified trajectory to the aircraft 1. In particular, the transceiver device 30 transmits a signal comprising the modified trajectory to the transceiver device 10. During the acquisition step 153, the transceiver device 10 of the aircraft 1 receives the signal comprising the modified trajectory. During the following step 154, the aircraft 1 follows the modified trajectory.

The first embodiment is advantageously implemented when the trajectory to be followed is a trajectory to approach a landing strip. During a refusal of the trajectory, the transceiver device 30 of the remote station 2 transmits the modified trajectory in particular in a predetermined time interval, the time interval being set so as to guarantee a maximum time period for the determination of the trajectory to be followed.

According to a second embodiment, when the instruction comprises a refusal of the desired trajectory, the steps 132, 133 and optionally 134 as described hereinabove are carried out again. At the end of step 133 (or optionally at the end of step 134), a step for calculating 160 a new trajectory is carried out.

The calculating step 160 is identical to the calculating step 121, with the exception of the fact that it is carried out as a function of updated constraints based on the current air traffic and/or according to the aircraft mission.

Additionally or in a variant, the calculating step 160 is carried out as a function of updated constraints according to the position of the aircraft. In particular, the calculation of the desired trajectory is carried out by the processing module 16 of the aircraft 1, as a function of constraints according to the current air traffic and/or according to the aircraft mission and/or the position of the aircraft.

At the end of the calculating step 160, the transmission step 122 and the acquisition step 123 are repeated for this new desired trajectory.

According to this second embodiment, the calculating step 160 is then carried out several times.

As shown in the flowchart of FIG. 2, steps 113, 121, 122, 160, 133, 134, 142, 153 and 154 are in particular carried out by the aircraft 1. Steps 111, 112, 123, 131, 132, 142, 151 and 152 are in particular carried out by the remote station 2.

Figure 3:
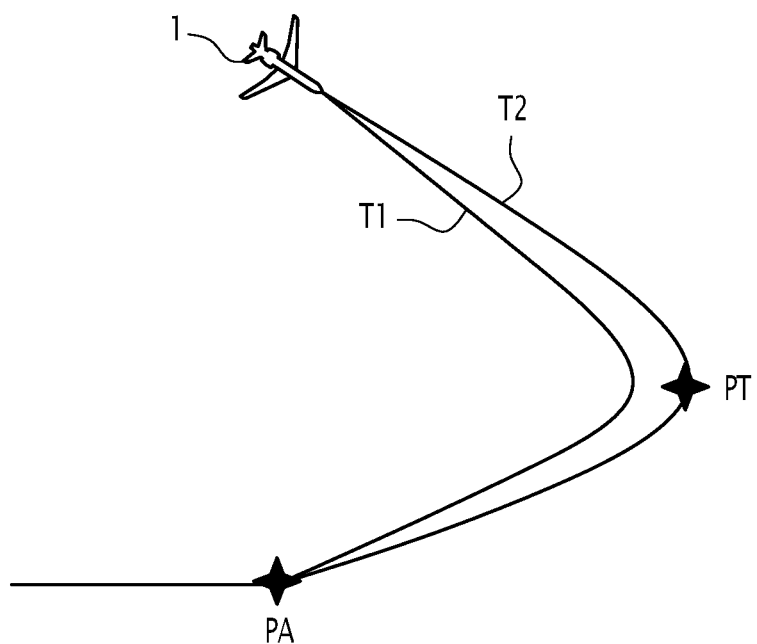
FIG. 3 is a schematic view of a trajectory of an aircraft, the trajectory being determined by the determining method of FIG. 2.

In reference to FIG. 3, two examples of determination of the desired trajectory during step 121 will be described. In both cases, the constraint is the arrival in the position to be reached PA at the indicated time. FIG. 3 illustrates two possible trajectories to do so, namely a first trajectory T1 and a second trajectory T2, the first trajectory T1 being shorter than the second trajectory T2. As a function of the operational parameters and the optimization algorithm, the processing module 16 chooses a desired trajectory among the possible trajectories T1, T2.

According to a first example, the processing module 16 takes account of a reduction in noise nuisances as an operational parameter. Because the first trajectory T1 is shorter than the second trajectory T2, the aircraft 1 following this first trajectory T1 has a reduced speed and thus emits fewer noise nuisances. The processing module 16 thus determines the first trajectory T1 as the desired trajectory. This example is in particular relevant when the trajectory is a trajectory approaching a landing strip.

According to a second example, the operational parameter consists of reaching a speed greater than or equal to a minimum speed of the aircraft 1 for stability reasons. In this case, the processing module 16 chooses the second trajectory T2 as desired trajectory, the second trajectory T2 having a distance greater than the first trajectory T1 and comprising a reference point PT in the example of FIG. 3.

One can then see that the present invention has a certain number of advantages.

In particular, the invention makes it possible to obtain a trajectory to be followed respecting constraints imposed by the remote station 2 and comprising parameters optimized for the aircraft 1 at the same time. The trajectory to be followed is thus a trajectory that allows a simple control of the air traffic and at the same time allows an economic flight for the aircraft 1.

Owing to the determining method according to the invention, the trajectory to be followed is determined by the aircraft 1 while respecting the constraints of the remote station 2.

As a result, the determining method makes it possible to obtain a more economical operation of the aircraft 1, while maintaining a safe operation in terms of traffic control, in particular a sufficient separation of the aircraft in the airspace and an optimal sequencing of the aircraft for example when approaching the landing strip 3.

In the context of mission management, the determining method makes it possible to comply with or adjust the trajectory followed to the constraints of the aircraft mission.

The invention claimed is:

1. A determining method for determining an optimized trajectory to be followed by an aircraft, the determining method being implemented by a determining system of the aircraft in communication with a control system of a remote station, the determining method comprising:
    a first acquisition of at least one constraint relative to at least one parameter of the trajectory to be followed, the at least one constraint being received from the control system by a transceiver forming a digital data transmission link between the aircraft and the remote station, wherein the at least one constraint is a function of current air traffic and comprises a maximum or minimum value of the at least one parameter of the trajectory to be followed;
    a calculation of a desired trajectory as a function of the at least one constraint, the desired trajectory being defined by the at least one parameter;
    a transmission of the desired trajectory to the remote station by the transceiver;
    a second acquisition of an instruction comprising an authorization to follow the desired trajectory or a refusal of the desired trajectory, the instruction being sent by the remote station and being received by the transceiver;
    a following of the desired trajectory when the instruction comprises the authorization to follow the desired trajectory; and
    a calculation of a new desired trajectory when the instruction comprises the refusal of the desired trajectory, the transmission and the second acquisition then being repeated for the new desired trajectory, wherein said calculation of the new desired trajectory is carried out as a function of updated constraints based on the current air traffic.

2. The determining method according to claim 1, wherein, the desired trajectory determined during the calculation is a trajectory optimized as a function of at least one operational parameter among fuel consumption, aerodynamic stability of the aircraft, flight duration, and noise nuisances.

3. The determining method according to claim 1, wherein the trajectory to be followed by the aircraft is an approach trajectory of a landing strip or a trajectory arriving at a traffic convergence point.

4. The determining method according to claim 3, wherein, when the instruction comprises the refusal of the desired trajectory, the second acquisition further comprises receiving a modified trajectory from the remote station, the modified trajectory being different from the desired trajectory, and the method further comprises a following of the modified trajectory.

5. The determining method according to claim 1, wherein the first acquisition further comprises acquiring a position to be reached at an indicated time.

6. The determining method according to claim 1, wherein each parameter of the at least one parameter is a parameter chosen from a group consisting of:
    speed;
    heading of the trajectory;
    gradient of the trajectory;
    modification start position of the trajectory;
    modification end position of the trajectory;
    altitude;
    latitude;
    longitude;
    distance to be traveled; and
    flight time of the aircraft.

7. The determining method according to claim 1, the method further comprises displaying the instruction received during the second acquisition on a display device of the aircraft.

8. The determining method according to claim 1, wherein the at least one constraint, the desired trajectory, and the instruction are transmitted via the digital data transmission link between the aircraft and the remote station.

9. The determining method according to claim 1, wherein the remote station is one of:
    a ground air traffic control center;
    a ground operation center;
    an operation center on board an aircraft; or
    a ground operation station for unmanned aircraft.

10. A determining system of an aircraft configured to, in communication with a control system of a remote station, determine an optimized trajectory to be followed by the aircraft, the determining system being configured to:
- acquire at least one constraint relative to at least one parameter of the trajectory to be followed, the at least one constraint being received from the control system by a transceiver forming a digital data transmission link between the aircraft and the remote station, wherein the at least one constraint is a function of current air traffic and comprises a maximum or minimum value of the at least one parameter of the trajectory to be followed;
- calculate a desired trajectory as a function of the at least one constraint, the desired trajectory being defined by the at least one parameter;
- transmit the desired trajectory to the remote station by the transceiver;
- acquire an instruction comprising an authorization to follow the desired trajectory or a refusal of the desired trajectory, the instruction being sent by the remote station and being received by the transceiver;
- follow the desired trajectory when the instruction comprises the authorization to follow this trajectory, and
- calculate a new desired trajectory when the instruction comprises the refusal of the desired trajectory, the transmission and the acquisition of the instruction then being repeated for the new desired trajectory, wherein said calculation of the new desired trajectory is carried out as a function of updated constraints based on the current air traffic.

11. A control method for controlling a trajectory of an aircraft, the control method being carried out by a control system of a remote station in communication with a determining system of the aircraft, the control method comprising:
- a determination of at least one constraint relative to at least one parameter of the trajectory of the aircraft as a function of current air traffic, the at least one constraint comprising a maximum or minimum value of the at least one parameter of the trajectory of the aircraft;
- a transmission of the at least one constraint to the aircraft over a digital data transmission link between the aircraft and the remote station;
- an acquisition of a desired trajectory of the aircraft from the determining system of the aircraft as a function of the constraint;
- a verification of compliance of the desired trajectory with a plurality of constraints updated based on the current air traffic;
- a transmission of an instruction to the aircraft, the instruction comprising an authorization to follow the desired trajectory or a refusal of the desired trajectory, as a function of the compliance of the desired trajectory;
- a control of the following of the desired trajectory when the instruction comprises the authorization to follow this trajectory, and
- a calculation of a new desired trajectory when the instruction comprises the refusal of the desired trajectory, the transmission of the instruction and the control then being performed for the new desired trajectory, wherein said calculation of the new desired trajectory is carried out as a function of updated constraints based on the current air traffic.

12. A control system of a remote station in communication with a determining system of an aircraft, the control system configured to:
- determine at least one constraint relative to at least one parameter of a trajectory of the aircraft as a function of current air traffic, the at least one constraint comprising a maximum or minimum value of the at least one parameter of the trajectory of the aircraft;
- transmit the at least one constraint to the aircraft over a digital data transmission link between the aircraft and the remote station;
- acquire a desired trajectory of the aircraft from the determining system of the aircraft as a function of the constraint;
- verify compliance of the desired trajectory with a plurality of constraints updated based on the current air traffic;
- transmit an instruction to the aircraft, the instruction comprising an authorization to follow the desired trajectory or a refusal of the desired trajectory, as a function of the compliance of the desired trajectory;
- control the following of the desired trajectory when the instruction comprises the authorization to follow this trajectory, and
- calculate a new desired trajectory when the instruction comprises the refusal of the desired trajectory, the transmission of the instruction and the control then being performed for the new desired trajectory, wherein said calculation of the new desired trajectory is carried out as a function of updated constraints based on the current air traffic.

13. A non-transitory computer-readable medium including a computer program comprising software instructions which, when executed by a computer, implement the determining method according to claim 1.

14. A non-transitory computer-readable medium including a computer program comprising software instructions which, when executed by a computer, implement the control method for controlling the trajectory of the aircraft according to claim 11.

* * * * *